Figure 1:
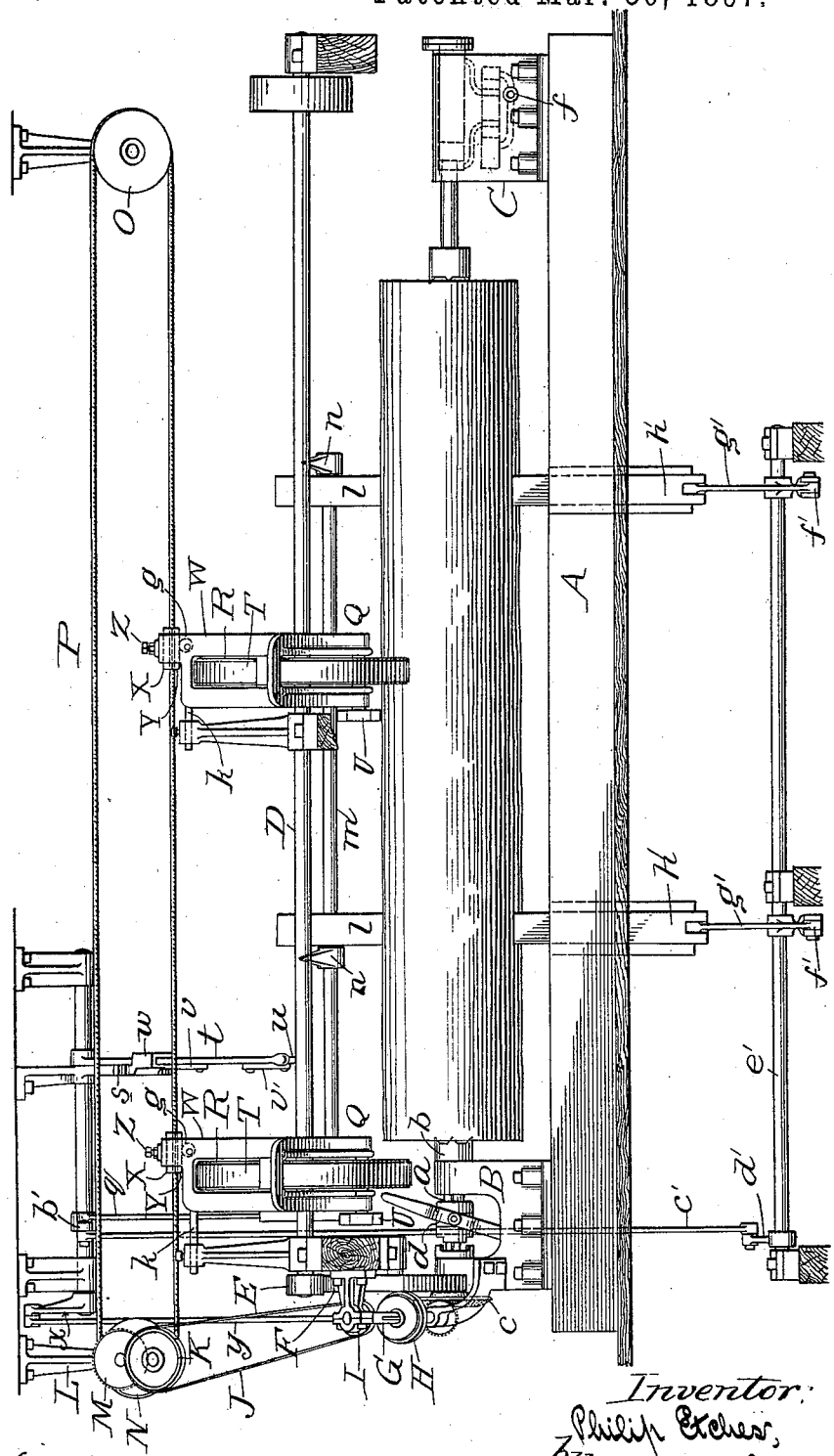

(No Model.)  3 Sheets—Sheet 1.

P. ETCHES.
WOODWORKING MACHINE.

No. 579,746.  Patented Mar. 30, 1897.

Attest:
C. C. Burdine
D. E. Burdine

Inventor:
Philip Etches,
by Dodge and Sons,
Att'ys

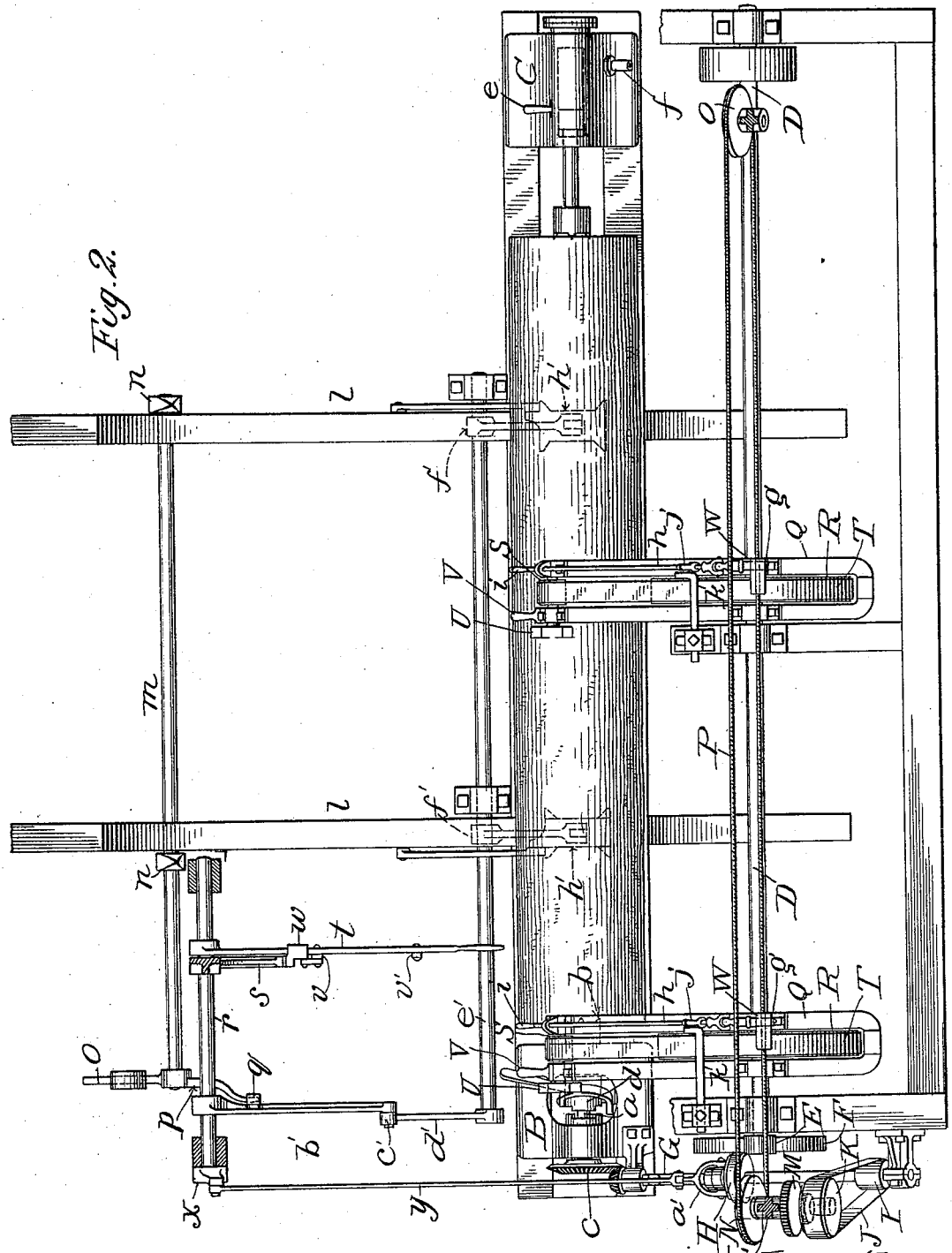

(No Model.) 3 Sheets—Sheet 3.
P. ETCHES.
WOODWORKING MACHINE.
No. 579,746. Patented Mar. 30, 1897.
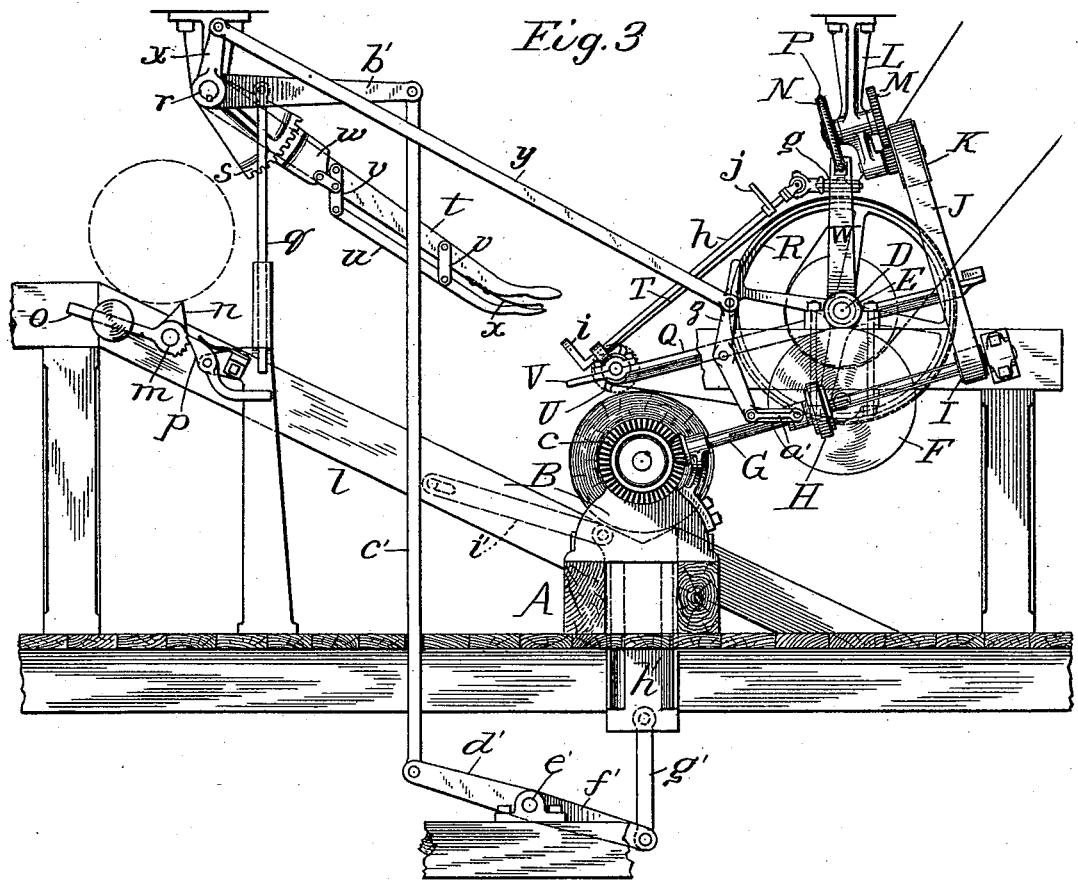
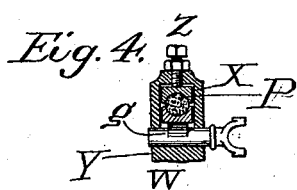
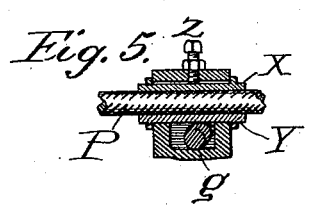
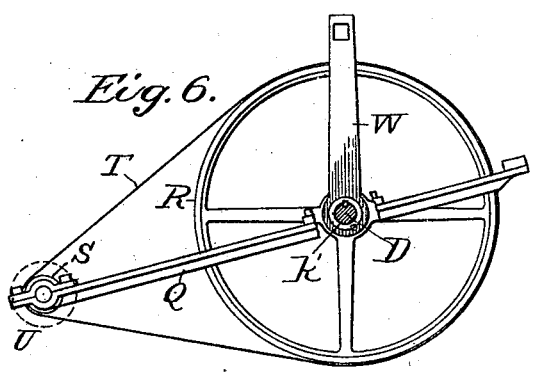

UNITED STATES PATENT OFFICE.

PHILIP ETCHES, OF TUPPER LAKE, NEW YORK.

WOODWORKING-MACHINE.

SPECIFICATION forming part of Letters Patent No. 579,746, dated March 30, 1897.

Application filed November 13, 1896. Serial No. 611,963. (No model.)

*To all whom it may concern:*

Be it known that I, PHILIP ETCHES, a citizen of the United States, residing at Tupper Lake, in the county of Franklin and State of New York, have invented certain new and useful Improvements in Woodworking-Machines, of which the following is a specification.

My invention relates to machines for rossing bark, the construction and advantages of which will be hereinafter set forth, reference being had to the accompanying drawings, in which—

Figure 1 is a rear elevation of the machine; Fig. 2, a top plan view; Fig. 3, an end elevation, and Figs. 4, 5, and 6 views showing certain details of construction.

My invention has for its object the sizing of the log by the machine and its attendant parts, so that the log will be properly centered without handling and the speed of rotation of the log and the rate of travel of the cutters will be automatically governed. Thus for logs of large diameter the speed of rotation is comparatively slow and the feed of the cutters likewise slow, while with a log of small dimensions the rotation is more rapid and the cutters travel faster. The adjustment of the mechanism for accomplishing this is under the present construction automatic.

A still further object of the invention is to provide a tail-center or spindle so constructed that it will maintain a fixed and constant pressure against the end of the log, holding said log firmly to its place.

Other advantages are present in this machine and will appear in the following description and explanation of the operation.

Referring to Figs. 1 to 3, inclusive, A indicates the base of the machine, upon which is mounted the head and tail stocks B and C, respectively. The head-stock is provided with a spindle $a$ and driving-head $b$, secured upon or forming a part thereof. The spindle is capable of being thrown into or out of positive connection with a driving-gear $c$ through the agency of a sliding clutch $d$, mounted upon the spindle $a$. The tail-stock is formed in its upper portion with a cylindrical chamber within which is mounted a piston connected to the spindle carrying the tail-center. The cylindrical chamber is provided with a port at each end, and steam is admitted to one or the other, as required, through the manipulation of a suitable valve controlled by a handle $e$. Steam is introduced through a pipe $f$, and in the position of the valve indicated in Fig. 1 the pressure is in rear of the piston and is being exerted upon the tail-center, holding it firmly to its work and ready to compensate for any splitting or yielding of the wood. When steam is first admitted, the center goes against the log with sufficient force to insure the proper engagement of its teeth with the log. It will be seen that the pressure on the center is constant, its action in coming into position quick, and its release or withdrawal from the log also sudden. By giving the cylindrical chamber length enough and making the spindle correspond different lengths of logs may be worked upon without change of position of the tail-stock.

D indicates the power or driven shaft provided at the head end of the machine with a friction pulley or wheel E, which in turn transmits motion to a wheel or disk F, mounted below and within the same vertical plane with the shaft D.

G denotes a cross-shaft mounted in suitable bearings carried by the head-stock and the framing, said shaft carrying at its lower end a bevel-gear meshing with the gear $c$ of the head-stock.

A driving friction-wheel H is slidably mounted upon shaft G and takes or bears against the side or face of the disk F, from which it receives its motion. Means (to be hereinafter described) are employed to shift wheel H toward and from the center of the disk F for the purpose of giving it greater or less speed. A belt-pulley I is secured to the opposite end of shaft G, and a belt J passes therearound and over a pulley K, mounted on a stud-axle carried in a hanger L. A pinion is mounted on the stud-axle and meshes with a cog M. Upon the axle upon which the cog M is secured and at the opposite end I mount a sheave or rope-wheel N. A similar wheel O is suspended from a hanger at the opposite end of the machine, and around these wheels N and O is passed an endless rope or band P.

From the connections just set forth it will be seen that a continuous motion is imparted to the driving-gear c and the endless band P.

Q denotes a frame pivoted upon a suitable bushing k', Fig. 6, said bushing being splined to shaft D, but free to move lengthwise thereof. Within the frame and connected to the bushing by a spline or feather is a pulley-wheel R, about which and a pulley S at the other end of the frame passes a driving-belt T. A cutter U is mounted on the axle that carries the pulley S. The frame is provided with a handle V at its forward end, while its opposite end is counterweighted.

Arms or frames W are secured upon the bushings k', upon which the frames C are pivoted, and said frames W are provided with means at their upper ends for clamping or grasping the rope P and causing said rope to feed or draw the cutter-frames along.

An opening is formed in the frame, and in this are mounted two shoes or blocks X and Y, the upper one of which may be adjusted by a set-screw Z. Normally the upper block is fixed, while the lower one is caused to rise or fall and to clamp or unclamp the rope.

A cam or eccentric g is mounted in the frame beneath block or shoe Y, and said cam is connected through a universal joint with a rod or arm h. Said arm is journaled at its lower end in a bearing fixed on the cutter-frame and terminates in a handle i. The construction of this part will be more clearly seen upon reference to Fig. 4. The arm h is provided with a stud or projection j, which when the cutter-frame reaches the end of its proper movement comes into contact with an adjustable stop k, turning said arm h, and consequently the cam g, permitting shoe Y to fall and release the grip on the rope. The cutter-carrying frame may be provided with any gage of suitable form to prevent the cutter from removing too much material, or the gage may be applied directly to the cutter itself.

Two cutter-frames are shown; but as they are similar in all details a description of one will suffice.

A skidway l is formed or placed in front of the machine, and a cross-shaft m extends across the same, carrying two spuds or points n and a weighted lever o, provided with ratchet-teeth, as shown in Fig. 3. A spring-pressed latch or pawl p engages with the teeth and holds the spuds up against the log when the parts are in the position shown in Fig. 3. The pawl p is provided with a tailpiece which occupies a position immediately below a depending arm q, attached to a mechanism now to be described. A shaft r is suspended in suitable hangers at a point above the shaft m, and to one of the hangers or other fixed part is secured a segmental rack s. Fixed to the shaft is a lever t, provided with an arm u, suspended therefrom by links v v', and a sliding block w, connected to the link v and adapted to engage the segmental rack. A spring x tends to hold the arm u down away from the lever t, and consequently to hold the block and rack in engagement. An arm x', secured to the shaft r, is in turn connected by a link y to a lever z, pivoted on the framework of the machine.

Connection is made between this lever z and the friction-wheel H through a link a', so that as the shaft r is turned the wheel H will be moved along the shaft G toward or from the center of the disk F by the connections just described, and consequently the speed of the machine regulated, as before mentioned.

A second arm b' is secured to the shaft r, and to this the depending arm q, before mentioned, is attached. To the end of arm b' is pivoted a link or rod c', which in turn is connected to an arm d', secured to a rock-shaft e'. This shaft is provided with arms f' f', to each of which is pivoted a link g', it in turn being connected to a gage-block h', mounted in suitable guides beneath the machine. The upper faces of these blocks are preferably made V-shaped. To one side, near the upper end, is attached an arm i', the opposite end being secured to the framework of the skidway and forming a continuation thereof.

The operation of the parts will now be described, assuming the parts to be in the position shown in Fig. 3. One of the attendants taking hold of the lever t depresses the same slightly, causing the depending arm q to depress the latch or pawl p and liberate the spuds. The log will then roll down beneath the arm u, withdrawing the block w and raising said arm and lever t to a point above the skidway equal to the thickness of the log. This movement of the lever t will of course be transmitted to the shaft r and from said shaft to the gage-blocks h' h' through the members b', c', d', e', f', and g', setting said blocks so as to hold the log in such position as to be accurately centered between the head and tail piece. So soon as the log had passed from beneath the arm u the spring x forces it down and causes the block to engage the rack, locking the parts in place. This of course is effected before the log passes onto the gage-blocks. The same movement of the shaft r which fixes the gage-blocks in their proper position also sets the friction-wheel H in its approximate position for driving the turning and cutter-feed mechanisms at their proper speeds. When the log is on the gage-blocks, the attendant shifts the handle e, causing the tail-spindle to advance and engage the log. This being done, the lever t is slightly elevated to withdraw the gage-blocks from the log, and the clutch d is then thrown in, causing the log to revolve. The attendants next bring the cutters down on the log, turn the handle l, causing the feed mechanism to be brought into operation and traverse the cutter-frames along the log, one from one end to the center and the other from the center to the opposite end. As soon as the cutters reach the ends of their respective travel the stops k engage the studs j, turn the shaft h, and disengage the rope-clamping mechanism. After the movement of the cutter-frames is complete the clutch $d$ is disengaged and the tail-center released. The cutter-frames may then be returned to their original position by hand, or, if it be so desired, weights may be employed to perform this operation.

Having thus described my invention, what I claim is—

1. In a woodworking-machine, the combination of a way for feeding the logs into the machine; means for measuring the size of the log as it passes down the way; and means operatively connected with said measuring device for holding the log in a position to be engaged by clamping mechanism.

2. In a woodworking-machine, the combination of log-measuring mechanism; centering devices connected therewith; means for rotating the log; and adjusting mechanism for controlling the speed of the rotating mechanism, said adjusting mechanism being operatively connected to the log-measuring device.

3. In a woodworking-machine, the combination of log-measuring mechanism; centering devices operatively connected therewith; means for rotating the log; traveling cutters; and adjusting mechanism for controlling the speed of the rotating mechanism, and the feed of the traveling cutters, said adjusting mechanism being operatively connected to the log-measuring device.

4. In combination with the skidway of a rossing-machine; a lever pivoted above said way; means connected to said lever for causing it to rise as the log passes thereunder; means for holding said lever in its adjusted position; and gage-blocks designed to receive and support the log, said blocks being operatively connected to the lever.

5. In combination with the skidway of a rossing-machine; a lever secured to a shaft above said way in line with the path of travel of the logs; locking devices substantially as described for said lever; gage-blocks located at the end of the skidway; and connections between the shaft and the gage-blocks.

6. In combination with the skidway of a rossing-machine; a counter-shaft mounted thereon and provided with spuds; a latch for holding said spuds in operative position; a lever secured to a shaft above said way in line with the path of travel of the logs; locking devices substantially as described for said lever; gage-blocks located at the bottom of the skidway; connections between the shaft and gage-blocks; and a depending arm $q$ for operating the latch.

7. In combination with the skidway and the gage-blocks; links connected to said gage-blocks and the skidway and designed to form a continuation thereof, substantially as and for the purpose described.

8. In a woodworking-machine, the combination of work-holding mechanism; means for causing the rotation thereof; cutters holding frames mounted above and designed to traverse the length of the machine; means for causing such traverse; and means for regulating the speed of the rotating mechanism and the travel of the cutter-frame one in relation to the other.

9. In a woodworking-machine, the combination of work holding and rotating means; a power-shaft; a cutter-frame mounted upon said shaft; an endless traveling belt; an arm extending from the frame to the belt; clamping mechanism carried by said arm comprising separable shoes designed to engage the belt, and an eccentric located beneath one of said shoes; and a lever or arm connected to said eccentric and extending down to operative position on the cutter-frame.

10. In a woodworking-machine, the combination of work holding and rotating means; a power-shaft D; cutter-frames mounted upon and designed to be traversed thereon; friction-disk F; pinion or pulley E; shaft G; friction-wheel H keyed to and slidable upon said shaft; means for causing the travel of the cutter-frames operatively connected with shaft G; and connections between shaft G and the work holding and rotating mechanism.

11. In a woodworking-machine, the combination of work holding and rotating means; a power-shaft D; cutter-frames mounted upon and designed to be traversed thereon; friction-disk F; pinion or pulley E; shaft G; friction-wheel H keyed to and slidable upon said shaft; means for causing the travel of the cutter-frames operatively connected with shaft G; connections between shaft G and the work holding and rotating mechanism; and means for varying the relation of wheel H to the center of disk F.

In witness whereof I hereunto set my hand in the presence of two witnesses.

PHILIP ETCHES.

Witnesses:
P. P. BERTHELOT,
J. B. BERTHELOT.